United States Patent Office 3,085,070
Patented Apr. 9, 1963

3,085,070
METHOD FOR SEPARATING SOLID OXIDES FROM ION EXCHANGE RESINS
Merrill J. Fowle, Newtown Square, and Oscar H. Hariu, Philadelphia, and George P. Masologites, Media, Pa., assignors to The Atlantic Refining Company, Philadelphia, Pa., a corporation of Pennsylvania
No Drawing. Filed Apr. 22, 1960, Ser. No. 23,918
8 Claims. (Cl. 252—420)

This invention relates to a method for separating particles of solid oxide catalysts and catalyst carriers from particles of an ion exchange resin and, more particularly, this invention relates to a method for separating particles of solid oxide catalysts and catalyst carriers from particles of an ion exchange resin which has been utilized in an aqueous medium for removing ionic impurities from the solid oxide catalysts or catalyst carriers.

It has been known for many years that small quantities of ionic impurities deleteriously affect many important characteristics of solid oxide catalysts and catalyst carriers such as their activity, stability, and specific reaction promotion properties. For example, in the field of the catalytic cracking of hydrocarbons, it was learned very early that the silica alumina catalyst employed for such cracking should be relatively free of alkali metal contamination in order that the catalyst would have maximum activity. Since the source of silica for such catalysts was sodium silicate, various expedients had to be devised for removing the sodium ions during the process of manufacturing the silica alumina catalyst.

When silica alumina catalysts came into commercial use for the catalytic cracking of various hydrocarbon charge stocks it was learned that when such stocks were contaminated with metal contaminants these would be deposited on the silica alumina catalyst and thereby change the product distribution characteristics of the catalyst. Thus, instead of converting the hydrocarbon charge into the desired gasoline boiling range and furnace oil boiling range products the catalyst would produce abnormally large quantities of normally gaseous hydrocarbons and coke with a subsequent loss of desired gasoline and furnace oil products.

Catalytic reforming processes employing platinum containing catalysts were developed in more recent years. It was found with certain types of these catalysts wherein the platinum was deposited on an alumina carrier, that the stability and life of the catalyst was deleteriously affected if certain cationic impurities such as sodium or anionic impurities such as the halogens were not removed from the alumina carrier prior to platinization.

Various methods have been utilized either for removing deleterious ionic impurities from solid oxide catalysts and catalyst carriers during their manufacture or for removing ionic impurities from these solid oxides when they have become contaminated during use. Some of these methods have involved treatment with chemical reagents, including thorough washing with water but, in addition to these methods, there have been proposed methods involving the use of ion exchange resins.

In these latter methods the particles of solid oxide catalyst or catalyst carrier are contacted with particles of an ion exchange resin contained in an aqueous medium whereby the ionic impurities are transferred from the solid oxide to the ion exchange resin. In order to utilize the purified catalyst or catalyst carrier it is necessary to separate the resin particles from the solid oxide particles. Various methods have been proposed for carrying out this separation including screening with a vibrating screen or elutriating with water. As will be described in more detail, neither of these methods when used separately have proved to be satisfactory for separating solid oxide particles from ion exchange resin particles, however, a method now has been found whereby a specific combination of elutriation and screening effects an efficient separation.

It is an object of this invention, therefore, to provide a method for separating particles of solid oxide catalysts or solid oxide catalyst carriers from particles of an ion exchange resin.

It is another object of this invention to provide a method for separating particles of solid oxide catalysts or solid oxide catalyst carriers from particles of an ion exchange resin which has been utilized in an aqueous medium for removing ionic impurities from the solid oxide catalyst or catalyst carrier.

Further objects of this invention will be apparent from the description and claims that follow.

In accordance with the method of this invention particles of solid oxide catalysts or solid oxide catalyst carriers in admixture with particles of an ion exchange resin in an aqueous medium are separated by first contacting the mixture of solid oxide particles and resin particles with an ascending aqueous stream in order to effect separation of at least a major portion of the solid oxide particles from the resin particles and thereafter the remaining portion of the solid oxide particles is separated from the resin particles by screening.

In the various processes which have been proposed for the removal of ionic impurities from solid oxide catalysts and solid oxide catalyst carriers by the use of ion exchange resins, the solid oxide particles are contacted with the ion exchange resin particles in an aqueous medium. If the impurities are cationic, a cationic exchange resin in the hydrogen cycle is employed, whereas if the impurities are anionic, an anionic exchange resin in the hydroxyl cycle is employed. The term ionic as applied to the various impurities found associated with the solid oxide catalysts and catalyst carriers is used to designate those impurities which may be contained in the lattice of the oxide or deposited on the surface of the oxide. It is not known in what form these impurities are contained in the lattice or deposited on the oxide, however, in an aqueous medium they may be transferred to an ion exchange resin.

The solid oxide particles are contacted with the resin particles at temperatures ranging from room temperature to the disintegration temperature of the resin, for a time sufficient to remove the desired quantity of ionic impurities from the solid oxide. In general, temperatures ranging from 120° F. to 250° F. are preferred with cation exchange resins, whereas with anion exchange resins the contacting is generally carried out at about room temperature, since anion exchange resins have considerably lower disintegration temperatures than those of the cation exchange resins. Contacting times ranging from a few minutes up to 24 hours have been proposed. In general, however, times range from one to about eight hours have been found to be sufficient for the removal of the deleterious ionic contaminants.

Various methods have been proposed for separating the solid oxide particles from the resin particles after the contacting step. For example, water elutriation methods have been proposed wherein solid oxide particles are carried away from the resin particles by means of an ascending stream of water so that the oxide particles pass out of the system as an overhead stream and the resin particles pass out of the system as a bottoms stream. It has been proposed in other processes to separate solid oxide particles from the resin particles by means of a vibrating screen. It has been found, however, that neither of these methods provide the desired separation of oxide particles from resin particles.

When water elutriation is employed it is found that a certain fraction of the solid oxide catalyst or solid oxide catalyst carrier particles have the same elutriation characteristics as the resin particles and, consequently, it is impossible to obtain a complete separation, i.e. there will always be a portion of the solid oxide admixed with the resin particles irrespective of the superficial velocity of the water employed to effect separation.

Ion exchange resins when dried and again rewetted with water first shrink and then swell with the result that the resin particles or beads split and crack. Consequently, since the ion exchange resins are employed in an aqueous medium, it is impractical to dry the mixture of resin and solid oxide particles in order to effect a dry screening operation since this operation would result in exceedingly rapid resin attrition rendering the resin unsuitable for further use, and eventually rendering the resin impossible to separate from solid oxide by screening. The wet screening methods which have been proposed have been proved to be unsuitable for separating the solid oxide from the resin particles since at the ratio of solid oxide to resin employed in the process of removing impurities from the oxide, the fine oxide particles will combine with the resin particles or larger oxide particles to plug the screen openings. Although vibrating screens or pulsating beds have been proposed in order to avoid this plugging, the mixture of fine and large particles quickly plugs the screen and stops the screening process completely.

The present invention provides a method for obviating the difficulties encountered in the methods previously proposed for separating solid oxide particles from resin particles. In the instant process the mixture of solid oxide and resin particles is first contacted with an ascending aqueous stream in order to effect separation of a major portion of the solid oxide particles from the resin particles. In addition to separating a major portion of the solid oxide, the finer oxide particles are selectively separated, the finest fractions being completely separated. Thus, although this separation step will remove a major portion of the solid oxide particles from the resin particles there will be small amounts of solid oxide particles of larger particle size which will have the same elutriation characteristics as the resin particles and, therefore, cannot be separated by this means irrespective of the superficial velocity of the aqueous stream employed for the elutriation. The total solids concentration in the aqueous contacting medium generally ranges from about 10 weight percent to 40 weight percent with the ratio of solid oxide to resin generally ranging from 0.25 to 3.0 grams of solid oxide to one milliliter of wet ion exchange resin. Consequently, since the resin is regenerated and reused to contact additional quantities of solid oxide, there will be a gradual accumulation of oxide particles admixed with the resin particles, which accumulation soon becomes quite appreciable.

In addition to the fraction of solid oxide particles which is impossible to separate by elutriation, there will be additional particles which theoretically could be separated from the resin particles but which because of the inefficiencies of the particular system employed, do not separate and are carried along with the resin particles. It has been found impractical to design a system which will provide a separation efficiency of the order of 100 percent. However, it has been found practical to design an elutriation tower having an efficiency of from 90 percent to 95 percent. With such an operation the amount of the solid oxide which is entrained with the resin, while not large, also remains with the resin at least until the next cycle. Thus in each cycle there is this quantity of oxide admixed with the resin. Since the resin is preferably regenerated after each contacting step, a portion of the solid oxide is subjected to acid treatment in the case of cation exchange resins or alkali treatment in the case of anion exchange resins, either of which is very undesirable since the properties of the solid oxide as a catalyst or catalyst carrier are deleteriously affected by such severe treatment.

In order to effect a separation of the major portion of the solid oxide particles from the resin particles by elutriation with water or aqueous solutions, it is necessary that the major portion of the solid oxide particles have elutriation characteristics differing from those of the resin particles. The two most important properties affecting elutriation characteristics are particle size and particle density. Ordinarily, the density of ion exchange resin particles varies within a rather narrow range as determined by the manufacturing process and, consequently, it is not possible to select a desired density except that it is within the limits set by the manufacturer. Similarly, the density of the various solid oxides varies within rather narrow limits. Accordingly, in order to effect separation by elutriation it is necessary that there be a difference in the particle size between the particles of the solid oxide and the particles of the ion exchange resin. Since solid oxides have a greater density than the density of ion exchange resins, if the oxide particles are smaller it is necessary that there be a considerable difference in particle size between the solid oxide and the resin as will be described.

Ion exchange resins as manufactured vary in particle diameter from approximately 0.3 millimeter to about 1.0 millimeter with a very few larger particles being present ranging up to 2.0 millimeters in diameter. The solid oxide catalysts which may be treated by the use of ion exchange resins may be exemplified by cracking catalyst such as the silica-alumina catalysts employed in the so-called fluid catalytic cracking process. The particle size of the catalyst particles for the fluid catalytic cracking process ranges from about 20 microns in diameter up to 150 microns in diameter with a small proportion of the catalyst ranging in particle size from 150 microns (0.15 mm.) to 300 microns (0.3 mm.) in diameter. If such a catalyst is treated with an ion exchange resin it has been found necessary, in order to effect a separation of a major portion of the catalyst particles from the resin particles by aqueous elutriation, to avoid using the fraction of resin particles having a particle diameter ranging from 0.3 to 0.4 millimeter in diameter and preferably to avoid using. the fraction having a diameter from 0.3 to 0.5 millimeter.

It has been found that in spite of this differential of 100 microns (0.1 mm.) or preferably 200 microns (0.2 mm.) in particle diameter between the largest catalyst particles and smallest resin particles, a certain proportion of the coarser catalyst particles will be sufficiently dense that they will have the same elutriation characteristics as the smaller resin particles. Hence, when the catalyst and the resin mixture is elutriated and the catalyst particles are carried out from the system overhead this coarser catalyst fraction will settle in the elutriating stream along with the resin particles and, in addition, as has been described there will be a small fraction of catalyst which will be entrained with the resin because of the inherent inefficiencies of the separating system.

It is preferred to use as the elutriating medium an aqueous medium which is the same as that utilized in the contacting of the resin and the solid oxide since, if the resin is subjected to aqueous media of different concentrations, its state of hydration will change, causing the beads to shrink or swell and thus crack and split. Thus if water alone is used during the contacting step, it is preferred to use water as the elutriation medium. If, however, either an acidic or a basic solution is employed in the contacting step it is preferred to use an aqueous solution of the same pH in the elutriation step since this will prevent a change in hydration state of the resin and thus prevent attrition of the resin.

The elutriation step removes the fine solid oxide particles from admixture with the coarser particles so that these fines are not present in the subsequent screening operation. The resin particles admixed with the minor portion of solid oxide particles after the elutriation step are separated from the solid oxide particles by means of screening. Various methods of screening may be employed, however, it is preferred to employ pulse screening. In this screening method the mixture of resin particles and minor portion of solid oxide particles in the aqueous medium utilized in the elutriation step is passed over a screen having a mesh size such that the resin particles which are larger than the solid oxide particles are retained on the screen and the solid oxide particles pass through the screen. In this method the screen remains stationary while the resin-solid oxide mixture of particles is kept in motion above the screen's surface by a pump such as a diaphragm pump located in the aqueous filtrate below the screen's surface. The pulsations of the liquid which keep the resin particles and solid oxide particles in motion also separate them somewhat such that the solid oxide particles can settle downwardly through the screen and the resin particles are caused to pass along the screen, preferably over a weir, and thus be removed from the system. It has been found necessary to maintain a net downward flow of water through the screen at all times in order to provide suitable separation of the solid oxide particles from the resin particles.

In addition to solid oxide catalysts exemplified by cracking catalysts such as silica alumina, solid oxide carriers exemplified by alumina and similar oxides also may be contacted with an ion exchange resin to remove impurities from the solid oxide. The aforementioned separation principles also apply with solid oxide carriers, for example, when cation exchange resins are utilized for the removal of cationic impurities from alumina or anionic exchange resins are utilized for the removal of anionic impurities such as the halogens from alumina.

The cation exchange resins suitable for removal of impurities from solid oxide catalysts and solid axide catalyst carriers are the commercially available strong acid, synthetic type materials, such as Amberlite IR–120 or Permutit-Q which are produced by the sulfonation of the copolymers prepared from a mixture of styrene and divinylbenzene. Amberlite IR–120 and Permutit-Q are well-known cation exchange resins and their preparation is described in detail in both the patented art and the technical literature, in particular, the detailed method for their preparation is set forth starting with the first full paragraph on page 84 of the book by Robert Kunin, entitled "Ion Exchange Resins," Second Edition, John Wiley & Sons, Inc., New York (1958). The ion exchange capacity, particle size range, and similar information for various cation exchange resins are available either from their manufacturers or from the technical literature.

Anion exchange resins which may be utilized in the removal of ionic impurities are exemplified by Permutit S–1 or Amberlite IRA–400. The latter is a quaternary, strong base type resin prepared by reacting a tertiary amine with a chloromethylated copolymer of styrene and divinylbenzene and is described in United States Patent No. 2,591,573. With respect to the Amberlite IRA–400 resin the production of the copolymer is described in detail on page 84 of the above-cited book by Robert Kunin, and the chloromethylation of this copolymer and its subsequent reaction with trimethylamine is described in detail in the last full paragraph of page 88 and continued on page 97 of this book.

The superficial velocities of the ascending aqueous medium required to separate solid oxide particles having a particle size range from 20 microns to 300 microns in diameter from resin particles having particle size range from 0.4 mm. to 2.0 mm. in diameter may range from about 2 feet per minute to about 8 feet per minute for temperatures in the range of room temperature to about 212° F. Superficial velocities at the lower end of the range are utilized with lower temperatures or with solid oxides having particle sizes considerably below the 300 micron upper limit, for example, in the 20 to 150 micron range. Higher superficial velocities are utilized with higher temperatures or with solid oxides in which a large proportion of the oxide is in the coarser particle size range.

After the elutriation step the aforementioned resin particles admixed with the minor portion of solid oxide particles are subjected to a screening operation. For example, a 40 or 50 mesh screen, preferably a 50 mesh (300 micron opening, U.S. Standard Sieve) has been found to be suitable for separating the minor portion of the above described fluid cracking catalyst from the resin. In the preferred method wherein pulse screening is employed, it has been found necessary to have a pulse frequency of at least 30 pulses per minute but not more than about 120 pulses per minute. With the lower frequencies the amplitude of the pulse must be larger in order to obtain a flow of resin across the screen and obtain suitable separation of solid oxide. With higher frequencies the pulse amplitude may be somewhat smaller. Pulse amplitudes of ¼ inch to ⅜ inch at 30 pulses per minute are satisfactory while a pulse amplitude of ⅛ inch is suitable for 60 pulses per minute. Satisfactory operation has been obtained with 1 inch depth of resin on the screen although this may be varied considerably by varying the other operating conditions. It has been found that if the feed to the screening operation contains from 20 to 50 grams of solid oxide per 1000 milliliters of resin with at least 10 percent to 20 percent of the solid oxide being in the larger particle size range, i.e. larger than 100 microns, from 98 percent to 100 percent of the catalyst will be removed at a feed rate of one gallon of catalyst-resin suspension in water per minute per square foot of screen. If the feed rate is increased to a very high value, for example, 5.5 gallons per minute per square foot of screen surface, the amount of solid oxide removed drops to about 90 percent. Accordingly, it is important that the feed rate across the screen be held to a reasonable level to prevent flooding of the system and consequent inefficiencies of operation.

The following examples are provided to illustrate certain specific embodiments of the invention and to demonstrate certain critical features of the invention.

*Example I*

A large number of elutriation experiments were carried out in a 4-inch inside diameter glass column having an effective height of about 5½ feet. A water slurry consisting of approximately 35 percent by weight total solids (dry basis) was made up with a sample of commercial silica alumina cracking catalyst (approximately 13 weight percent alumina, 87 weight percent silica) taken from an operating fluid catalytic cracking unit and with Permutit-Q cation exchange resin. The cracking catalyst was screened and only that portion which had a particle diameter of approximately 150 microns or less was employed. The resin particles also were sized and only those having a particle diameter of about 400 microns or more were employed. The ratio of catalyst to resin was 500 grams of catalyst per 1000 milliliters of wet drained resin. From 1 to 2 hours were utilized for each experiment.

Three types of operation were employed in each of which the operation conditions were varied:

(1) Continuous operation wherein the catalyst-resin slurry was introduced near the top of the tower, the catalyst was removed from the top of the tower and a level of closely spaced resin particles was maintained within the column while resin was withdrawn continuously from the bottom of the tower.

(2) Continuous operation as in (1) except resin was withdrawn from the bottom of the column without allowing a level of resin to form in the column, that is the resin particles were maintained in a relatively widely separated condition.

(3) Batch operation wherein a portion of the catalyst-resin slurry mixture was introduced into the column prior to elutriation and no bottoms stream was taken out of the column during elutriation.

All three types of operation were carried out such that there was essentially no carry-over of resin particles with catalyst particles in the overhead stream.

With type (1) operation employing a 1200 milliliter per minute feed of the described slurry and an operating temperature of 150° F. it was found that from 1.0 to 2.0 grams of catalyst per 1000 milliliters of resin remained in the resin with an optimum superficial water velocity in the column in an ascending direction of about 2.2 feet per minute.

The type (2) operation employed a 2000 milliliter per minute feed of the described slurry at an operating temperature of 150° F. It was found that from 0.5 to 1.5 grams of catalyst per 1000 milliliters of resin remained in the resin with an optimum superficial water velocity in the column in an ascending direction of about 3.5 feet per minute.

The type (3) batch operation was also carried out at an operating temperature of 150° F. It was found that from 0.8 to 2.8 grams of catalyst per 1000 milliliters of resin remained in the resin at the bottom of the column with an optimum superficial water velocity of about 4.0 feet per minute upwardly through the column.

It will be seen from the foregoing experiments that although substantially ideal elutriation conditions were employed and although the solid oxide catalyst had been screened to take out the larger particles which would be more difficult to elutriate, it was not possible to separate all of the catalyst from the resin.

*Example II*

A three-day (71 hour) continuous elutriation experiment was carried out to determine if coarse catalyst particles would accumulate in the resin fraction. A slurry similar to that employed in Example I was utilized for this experiment except that the catalyst represented the full particle size range of a normal used synthetic silica alumina cracking catalyst and therefore contained particles ranging up to 175 microns in diameter. The same resin was employed and the same catalyst to resin ratio and weight percent total solids was utilized. Slurry was fed into the tower near the top at an average rate of 1580 milliliters per minute with an operating temperature maintained at about 150° F. Elutriation water was introduced into the bottom of the tower at a rate sufficient to give 3.0 feet per minute superficial velocity up the tower. At two-hour intervals the resin which had been removed from the bottom of the tower was slurried with additional catalyst to make up additional feed slurry for charging to the top of the tower. The ratio of catalyst to resin in the feed was maintained constant throughout the run at 500 grams of catalyst per 1000 cc. of resin. The operation was carried out so that there was substantially no resin carried overhead with the catalyst.

The resin fraction from the bottom of the elutriation tower was anlyzed periodically during the experiment and it was found that there was an accumulation of coarse catalyst in the resin fraction so that at the end of the experiment there were found 22.5 grams of catalyst per 1000 milliliters of resin in the resin fraction of which 18 grams were particles larger than 150 microns in diameter. The quantity of particles larger than 150 microns in the charge catalyst amounted to 0.83 weight percent, whereas the quantity of particles larger than 150 microns in the catalyst which accumulated in the resin amounted to 82.0 weight percent. These data demonstrate that catalyst accumulates in the resin fraction from the elutriation tower and that this catalyst is selectively the coarser and denser particles which have more nearly the same elutriation characteristics as the resin particles. An additional calculation showed that approximately 70 percent of the catalyst particles larger than 150 microns in diameter charged to the elutriation tower were accumulated in the resin fraction.

*Example III*

Two elutriation runs were made in continuous operation employing a 4-inch internal diameter glass column similar to that employed in Examples I and II except that it was somewhat shorter, i.e. approximately 3 feet long, so that there was a shorter distance for the solids to separate. A solid slurry similar to that employed in Example I, except that the catalyst to resin ratio was 472 grams of catalyst per 1000 milliliters of resin, was employed. The particle sizes of the catalyst and resin were the same as in Example I.

Superficial water velocities of 4 feet per minute were employed with a feed of 780 milliliters per minute. No resin was carried overhead with the catalyst.

In one experiment an operating temperature of approximately 170° F. was employed and 23 grams of catalyst per 1000 milliliters of resin was found in the resin fraction which was withdrawn continuously from the bottom the tower in the type (2) operation described under Example I.

In the second experiment a temperature of approximately 150° F. and approximately 36 grams of catalyst per 1000 milliliters of resin were found in the resin fraction withdrawn from the tower again employing type (2) operation.

A tower operating efficiency of approximately 92 to 95 percent based on the quantity of catalyst separated as compared with the amount charged was obtained in these experiments. These experimental runs were made to simulate actual plant runs wherein similar operating efficiencies might be expected to be encountered.

*Example IV*

A number of experimental screening runs were made on catalyst-resin slurries similar to the slurry obtained as the resin bottoms fraction in Example III. The catalyst had a particle size range from 20 to about 150 microns in diameter and the Permutit-Q cation exchange resin had a particle size ranging from about 0.4 millimeter to 1.0 millimeter. From 20 to 35 grams of catalyst per 1000 milliliters of resin, of which only about 10 weight percent was in the 20 micron to 100 micron particle size range, the remainder being coarser material, were used in the various runs and from 30 to 50 percent solids by volume were contained in the feed slurry to the screening operation. In the screening operation a screen having an opening of approximately 300 microns, i.e. 50 mesh U.S. Standard Sieve size, was employed.

A pulse operation was utilized wherein the frequency of the pulses and the magnitude or amplitude of the pulse could be varied. It was found that from 95 to 99 weight percent of the catalyst in the feed to the screen could be removed with feed rates of from ½ to 5 gallons per minute per square foot of screen surface with about a 1-inch solids level maintained on the screen and a pulse frequency of from 30 to 120 pulses per minute with a pulse height or amplitude of from ⅛ inch to ¼ inch. The preferred pulse frequency was 60 pulses per minute with the preferred pulse height of about ⅛ inch. These experiments demonstrated that screening can be utilized to separate solid oxides from admixture with ion exchange resins when a major portion of the solid oxide and the finer particles of the solid oxide have first been selectively removed from admixture with the resin.

*Example V*

In order to demonstrate that a slurry of solid oxide particles and ion exchange particles could not be separated by screening without the elutriation step, a sample of catalyst-resin slurry utilized in Example I was passed over the screen employed in Example IV. The screen plugged exceedingly rapidly with this mixture of catalyst and resin so that within a very few minutes, i.e. approximately between 10 and 15 minutes, it was completely plugged and the operation had to be stopped in order to prevent destruction of the apparatus.

We claim:

1. The method of separating particles of solid oxide catalysts and solid oxide catalyst carriers from admixture with particles of an ion exchange resin in an aqueous medium, including solid oxide particles having the same elutriation characteristics as said resin particles, said solid oxide particles ranging in diameter from about 20 microns to about 300 microns and said resin particles ranging in diameter from about 0.4 millimeter to 2.0 millimeters, which comprises contacting said mixture of solid oxide particles and resin particles with an ascending aqueous stream having a superficial velocity ranging from about two feet per minute to about eight feet per minute to separate a major portion of said solid oxide particles from said resin particles and thereafter separating said resin particles from the remaining solid oxide particles, including said solid oxide particles having the same elutriation characteristics as said resin particles, by passing the mixture of remaining solid oxide particles and resin particles over a screen having a mesh size such that only said solid oxide particles pass downwardly through the screen.

2. The method according to claim 1 wherein the ion exchange resin is a cation exchange resin.

3. The method according to claim 1 wherein the ion exchange resin is an anion exchange resin.

4. The method of separating particles of a silica alumina cracking catalyst from admixture with particles of an ion exchange resin in an aqueous medium, including silica alumina particles having the same elutriation characteristics as said resin particles, said silica alumina particles ranging in diameter from about 20 microns to about 300 microns and said resin particles ranging in diameter from about 0.4 millimeter to 2.0 millimeters, which comprises contacting said mixture of silica alumina particles and resin particles with an ascending aqueous stream having a superficial velocity ranging from about two feet per minute to about eight feet per minute to separate a major portion of said silica alumina particles and thereafter separating said resin particles from the remaining silica alumina particles, including said silica alumina particles having the same elutriation characteristics as said resin particles, by passing the mixture of remaining silica alumina particles and resin particles over a screen having a mesh size such that only said solid oxide particles pass downwardly through the screen.

5. The method according to claim 4 wherein the ion exchange resin is a cation exchange resin.

6. The method of separating particles of alumina from admixture with particles of an ion exchange resin in an aqueous medium, including alumina particles having the same elutriation characteristics as said resin particles, said alumina particles ranging in diameter from about 20 microns to about 300 microns and said resin particles ranging in diameter from about 0.4 millimeter to 2.0 millimeters, which comprises contacting said mixture of alumina particles and resin particles with an ascending aqueous stream having a superficial velocity ranging from about two feet per minute to about eight feet per minute to separate a major portion of said alumina particles from said resin particles and thereafter separating said resin particles from the remaining alumina particles, including said alumina particles having the same elutriation characteristics as said resin particles, by passing the mixture of remaining alumina particles and resin particles over a screen having a mesh size such that only said alumina particles pass downwardly through the screen.

7. The method according to claim 6 wherein the ion exchange resin is a cation exchange resin.

8. The method according to claim 6 wherein the ion exchange resin is an anion exchange resin.

References Cited in the file of this patent

UNITED STATES PATENTS

| | | |
|---|---|---|
| 2,703,314 | Dirnberger | Mar. 1, 1955 |
| 2,967,833 | Kimberlin | Jan. 10, 1961 |